United States Patent [19]

Bates

[11] 4,123,245
[45] Oct. 31, 1978

[54] APPARATUS AND METHOD FOR PRESS BENDING AND TEMPERING GLASS SHEETS AND THE LIKE

[75] Inventor: William G. Bates, Sellersville, Pa.

[73] Assignee: Selas Corporation of America, Dresher, Pa.

[21] Appl. No.: 845,339

[22] Filed: Oct. 25, 1977

[51] Int. Cl.² ............................................... C03B 23/02
[52] U.S. Cl. ...................................... 65/104; 65/106; 65/268; 65/273
[58] Field of Search ................. 65/104, 273, 275, 268, 65/106

[56] References Cited

U.S. PATENT DOCUMENTS 3,951,634  4/1976  Hall et al. .............................. 65/104

FOREIGN PATENT DOCUMENTS 2,316,197  1/1977  France ...................................... 65/106

*Primary Examiner*—Arthur D. Kellogg
*Attorney, Agent, or Firm*—Miller & Prestia

[57] ABSTRACT

Apparatus and method for press bending and tempering thin glass sheets. The sheet is heated in a furnace to a temperature sufficient to effect deformation thereof, is kept heated in a holding area immediately after the sheet has left the furnace and is then bent by being sandwiched between the press bending members and quenched.

20 Claims, 2 Drawing Figures

APPARATUS AND METHOD FOR PRESS BENDING AND TEMPERING GLASS SHEETS AND THE LIKE

BACKGROUND OF THE INVENTION

The present invention relates to an improved apparatus and method designed to press bend and temper glass sheets and the like. The improved apparatus and method are specifically adapted to impart the desired shape to thin sheets of glass such as those now proposed for use in the automotive industry, which are approximately 3 to 4 millimeters thick.

PRIOR ART

Automobile manufacturers have been faced with the problem of building automobiles and other vehicles which have improved fuel economy. One measure has been to build lighter weight vehicles. Accordingly, it has become highly desirable to provide thinner glass for vehicle windows to aid in the overall goal of gasoline consumption reduction.

Presently, many manufacturers are producing vehicles with windows having gently sloping curved surfaces. These curved surfaces are provided for aesthetic reasons as well as to streamline the vehicle and to reduce wind resistance. However, it has been found that sloping curves are not easily imparted to light weight, thin glass sheets having a thickness of 3 to 4 millimeters or so, as the sheet often cracks due to excessive cooling before pressing during treatment with conventional equipment designed for thicker glass, or if the glass is vertically hung from tongs as it travels along the process route and is treated while too hot, the tongs or gravity forces often stretch or deform the sheet.

Accordingly, to efficiently press bend and temper thin glass sheets it is critically important that certain process parameters be carefully controlled. These include: (1) transfer time between furnace and quench, (2) glass temperature during transfer, and (3) force exerted by the glass-grasping members. Critical control is needed so that the desired shape and temper will be imparted to the glass sheet. Further, the glass must be heated to a substantially uniform temperature throughout and then suddenly quenched on its outside surfaces while the interior portion of the glass remains in a fluid condition. In such manner, undue stresses are avoided which might otherwise result in glass breakage.

The patent to Ritter U.S. Pat. No. 3,265,484 discloses a method and apparatus for press bending and tempering glass sheets wherein the glass is horizontally passed from the furnace to a pressing station and then to a quench. The system is horizontally disposed, and the shaping members are not capable of moving along with the sheet to effect rapid transfer of the sheet from the furnace to the quench.

Seymour U.S. Pat. No. 3,507,639 discloses a method of pre-shaping glass sheets designed to decrease processing deformation of the sheet by force-cooling the portions of the shaping dies that engage those portions of the glass sheets that will be used for support during transportation of the sheet through the quench. Here again, the glass is horizontally disposed as it travels across the conveyor from one work section to the other, and the sheet is allowed to cool considerably between the furnace and pressing stations.

Frank U.S. Pat. No. 3,737,297 discloses an apparatus for press bending glass sheets wherein a first conveyor horizontally transports the sheet through a heating furnace into a first mold position. The molds are then moved along with the sheet along to a second mold station whereby the glass is then transported by a second conveyor to the quench. In order to insure proper alignment between the glass sheets and the molds, the movement of the glass sheet is stopped momentarily as it exits from the furnace. This momentary stoppage allows a thin sheet to cool to an undesirable degree.

The patent to Knapp U.S. Pat. No. 3,869,269 discloses a method and apparatus for press shaping heat-softened sheets wherein a plurality of upper and lower horizontally disposed shaping molds impart the desired shape to the heated glass. The preferred embodiment includes an auxiliary roller means to contact the glass sheet when a portion of sheet deviates in a downward direction from the desired shape by a predetermined amount.

The patent to Shaffer et al. U.S. Pat. No. 3,869,271 discloses a set of guide rollers disposed between the furnace and the mold station. Here, the guide rollers prevent glass deformation as the glass is passed from the furnace to the vacuum mold area. No means for transporting the sheet from the mold area to a quench is shown.

The patent to Jack U.S. Pat. No. 3,870,500 discloses an apparatus and method for bending the toughening glass sheets. Vertically disposed elongated rollers support the glass as it is carried through the furnace to the bending station. At the bending station, male and female cooperating dies are mounted; one die member is adapted to press through the support members to move toward the other die to impart the desired bend to the sheet. A lifting device associated with the die, and passing through the support members, lifts the sheet and provides support as the sheet is carried by one die toward the other die.

The known prior art does not solve the problem of adequately bending and tempering unusually thin glass sheets having a thickness of 3 to 4 millimeters. Transfer between furnace and quench is carried out in such a way that, practically, a thin sheet cannot be bent without breaking. Further, the prior art does not provide any means for eliminating deformation caused by the stretching or pulling of tongs, in a system wherein the sheet is carried vertically by tongs along the process path.

OBJECTS OF THE INVENTION

Accordingly, it is an object of the present invention to provide a glass bending and tempering apparatus and method designed especially to bend unusually thin glass sheets wherein the sheet transfer time between the furnace and quench is minimized so that chances of sheet breakage during the process are considerably reduced.

Further, it is another object to provide a glass bending and tempering apparatus and method that not only facilitates transfer of the sheet from furnace to quench, but also securely grasps and supports the sheet during the process without subjecting the sheet to undue stretching forces.

It is a more specific object of the present invention to provide a glass bending and tempering apparatus and method wherein the glass is heated to a substantially uniform temperature throughout and then suddenly quenched on its outside surfaces while leaving the sheet interior in a fluid state so that undue stresses are avoided.

SUMMARY OF THE INVENTION

These and other objects are met by the apparatus and method disclosed herein. A heated holding station is located downstream from the furnace to keep the glass at tempering temperatures, while the system prepares for transfer to press and quench. After the sheet is heated in the furnace, it is conveyed into the holding station and stopped at the location that ultimately provides precise alignment between the sheet and shaping members. Opposed shaping members are positioned on different sides of the holding station, and immediately upon exit of the sheet from the holding station, the shaping members engage the sheet to impart the desired shape thereto. At the same time, the shaping members and sheet are transported in unison toward the quench. The shaping members disengage the sheet and stop prior to reaching the quench. The sheet moves continuously into the quench and stops for quenching.

As expected, it has been found that by providing a means for concurrently conveying the sheet and shaping members to the quench while the shaping members converge toward the sheet to impart the desired shape thereof, the necessary temperature relationships are maintained and the pressing operation is performed within a very short time.

The following detailed description is that of a specific embodiment. Specific terms will be used in the interest of clarity, but this use is not intended to define or to limit the scope of the invention, which is defined in the appended claims.

DRAWINGS

FIG. 1 is a plan view of one specific apparatus embodying features of this invention, with certain parts drawn in phantom for increased clarity, and with arrows indicating the movement of the shaping members and sheet in accordance with the disclosed apparatus and method; and FIG. 2 is a detailed section view, taken along the lines and arrows II—II of FIG. 1, showing the engagement of a glass sheet by the shaping members in accordance with the invention.

DETAILED DESCRIPTION

Figure 1:
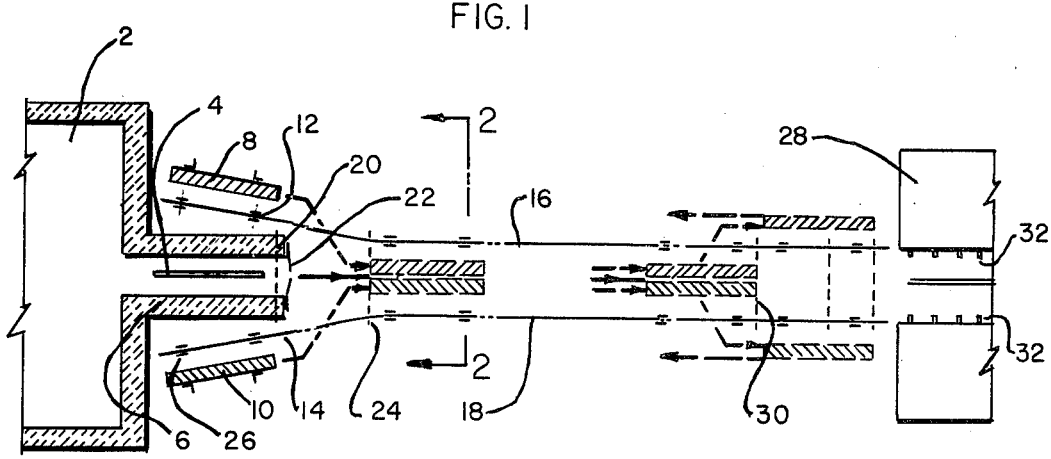

With reference to the drawings, and especially to FIG. 1, there is shown a glass heating furnace 2 and a holding station 6 connected to and extending beyond the downstream portion of furnace 2. The holding station, as shown, comprises an insulated enclosure provided with a plurality of electrical resistance heaters (not shown) attached to the inside wall portions of the station. The furnace itself is provided with a plurality of gas or oil burners or electric elements (not shown) adapted to heat the glass sheet 4 to the desired temperature.

Sensor means 20, such as a source which generates an ultraviolet light beam, is located at the downstream portion of holding station 6 adjacent exit doors 22.

A pair of complementary press bending and shaping members 8, 10, are movably mounted on tracks 16, 18, via rollers 26. The tracks 16, 18 comprise angled track portions 12, 14 that extend along either side of holding station 6 and are angled toward each other outside the holding station 6, and are then parallel. As is apparent from FIG. 1, parallel track portions 16, 18 extend between holding station 6 and a quench station 28 that is located downstream.

Second sensor means 24 and a third sensor means 30 are located along the tracks, and their operation will be explained hereinafter.

As shown in FIG. 1, the quench 28 comprises a plurality of fluid jets 32 which serve to cool and temper the sheet rapidly. Fluid jets are used, preferably air, since they cool the thin glass very quickly and efficiently along its outside surfaces while still allowing the interior portion of the thin glass to remain in a fluid or semi-fluid state, so that undue stress on the sheet is avoided.

Figure 2:
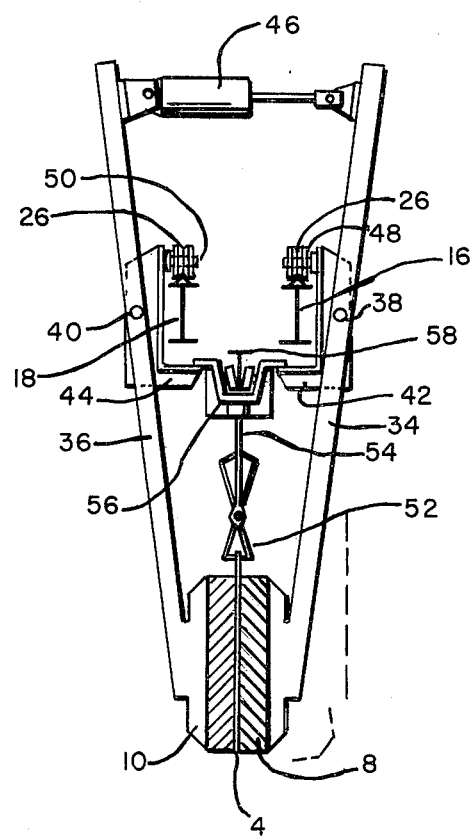

Turning now to FIG. 2, press bending members 8, 10 depend from arms 34, 36, respectively. Each arm 34, 36 is connected by a pivot pin 38, 40 to support members 42, 44. The arms 34, 36 are linked together by an air cylinder 46, that, when expanded, causes the press bending members 8, 10 to converge toward each other to impart the desired bend to the thin glass sheet 4 interposed therebetween. To insure that both press bending members are stably interconnected, other expansible linkage members may be provided between the arms.

In accordance with this invention, any suitable drive means for moving the press bending members toward each other may be provided, and the drive may move only one of the shaping members toward the other, if desired.

Rollers 26 are rotatably mounted on shafts 48, 50 that are journaled in the support members 42, 44. The rollers 26 are positioned on tracks 16, 18 for movement therealong. The entire shaping member assembly is suspended from and driven along the tracks via conventional drive means such as an electric motor (not shown).

Sheet 4 depends from tongs 52 that are supported by rod 54, that, in turn, depends from carriage assembly 56. Carriage assembly 56 depends from an overhead "T" support 58 that is engaged to an overhead conveyor (not shown) that extends along the entire process path from the furnace entrance to the quench exit.

Accordingly, the glass sheet 4 is hung from tongs 52 as they are moved along the process path. When the glass sheet 4 is properly positioned in a stationary manner within the holding station 6 the support members 42, 44 engage the tong carriage assembly 56. The assembly 56 and the shaping members 8, 10 are synchronously driven downstream along the track in unison. Instead of providing separate synchronous drives for the sheet and the shaping members, one common drive should be employed to transport the entire glass sheet-shaping member assembly between the holding station and the quench. The common drive may, for example, include means for latching the carriage 56 to the supports 42, 44 while disengaging "T" support 58 from its associated overhead conveyor.

In operation, the glass sheet 4 is first heated to a predetermined, critically controlled deformation temperature within furnace 2. Preferably, this temperature is between 1200° and 1250° F. The carriage assembly 56 and sheet 4 depending in a vertical plane therefrom are moved to the holding station 6 wherein the electrical resistance heaters insure that the glass is held at the proper temperature. As the leading edge of the sheet 4 passes ultraviolet light sensor means 20, a signal from the sensor stops the glass conveyor bringing the glass into the hold station so that the glass and press are properly aligned. When all other conditions in the system are ready, the glass sheet and shaping member assembly begin to be transferred in unison by a common drive toward the quench.

As the leading edge of sheet 4 passes second sensor 24, the air cylinder 46 is actuated and expands so that the press bending members 8, 10 move toward each other to engage and press bend the sheet. The sheet and press bending members then move together in unison in the downstream direction of the process path until the leading edge of the glass passes sensor 30.

Sensor 30 actuates contraction of the air cylinder 46 so that the press bending members 8, 10 move apart from each other. The press bending members are disengaged from the common drive and brought to a stop while the glass sheet is conveyed to the quench 28. The press bending members 8, 10 are then returned to their initial positions on the angled track portions to await the arrival of another sheet in the holding station. The members 8, 10 may be returned to their initial positions on the angled track portions 12, 14 via separate return track loops (not shown). Further, members 8, 10 are properly positioned on the respective angled track portions 12, 14 by the aid of mechanical stop members (not shown) that may be provided on the upstream end portions of the angled tracks.

In the practice of this invention it has been found that the time in which the transfer from holding station to quench may be completed in less than 5 seconds (which time is the maximum transfer time in which a 3 mm. thick sheet can be properly press bent and tempered). This transfer time is preferably between 3 and 4 seconds.

The invention has been described with reference to certain drives and actuation means therefor to transport the press bending members and the glass sheet in unison along the track and to move the shaping members toward each other while in transport to effect the press bending of the glass on the run. It will be apparent to those skilled in the art that other equivalent drives and actuation means may be substituted for those herein disclosed without departing from the spirit of the invention.

Although one important application for the process and apparatus of this invention resides in the field of bending thin automotive windows to reduce car weight and fuel consumption, other thin glass objects may be pressed and bent as well.

Although the specific embodiment of the invention selected for illustration in the drawings shows the glass and the press moving together in a generally horizontal direction while the glass is pressed, vertical movements either up or down, or moving in other directions, may be provided instead. In many cases it is highly desirable to move the glass in the direction of its minimum dimension, particularly where the glass piece is much longer than it is high. In such a case, an upward or downward path is highly desirable. For example, the rear window of an automobile could be conveyed with its long dimension horizontal, and it is desirable to transfer such a rear window piece upwardly or downwardly out of the holding station into the quench. In this manner, a minimum transfer distance and time are required.

With respect to the actuation of the press head, it is highly desirable to provide a first stage in which the pressing heads are parked outside the wall of the holding station, and are thereafter rapidly moved laterally from the parked position to a position near the glass in a ready position from which the pressing operation ultimately takes place. The provision of a parked stage and a ready stage may be performed by two different actuation systems, acting on independent mechanisms. The lateral motion from the parked position to the ready position may be accomplished by a cam arrangement, linked to the transfer position so that it is repeatable, or by other arrangements as well. Although various means may be utilized for causing the pressing action to occur, this may be advantageously accomplished by using air over oil cylinders in which air is utilized to actuate the flow of oil in cylinders in a manner to displace the bending heads into their glass bending positions.

It will be further appreciated that the wide variety of other modifications may be utilized without departing from the spirit of the invention, and that equivalent elements may be substituted for those specifically shown and described. Additionally, parts may be reversed and certain features may be used independently of other features, all without departing from the spirit and scope of the invention as defined in the appended claims.

I claim:

1. In a method for press bending a glass sheet or the like, wherein the sheet is heated at a temperature sufficient to effect deformation thereof, said sheet depends from a carriage assembly, a pair of complementary shaping members depends from a shaping member assembly, said carriage assembly adapted to engaged said shaping member assembly to align said sheet with said shaping member, and wherein said sheet is sandwiched between said pair of complementary shaping members and cooled in a quench to temper the sheet, the steps comprising:
   (a) keeping the sheet heated in a holding area immediately after it has left the furnace,
   (b) providing alignment between said sheet while in said holding are with said shaping member,
   (c) synchronously transporting by a common drive said sheet and shaping members toward said quench, and
   (d) squeezing said sheet between the shaping members to press bend said sheet on the run while concurrently transferring it toward the quench.

2. The method defined in claim 1 further comprising completing step (d) within a maximum of 5 seconds after the sheet has left the holding area.

3. The method defined in claim 2 further comprising completing step (d) within 3 to 4 seconds after the sheet has left the holding station.

4. The method defined in claim 1 further comprising first heating the sheet to a temperature of about 1250° F. in the furnace prior to step (a).

5. The method defined in claim 1, wherein step (d) further comprises driving each shaping member substantially simultaneously, as a unit along one of a pair of tracks that extend between the holding area and the quench.

6. The method defined in claim 5, wherein step (d) further comprises moving at least one of the shaping members toward the other as they both travel along the tracks to effect shaping of the sheet as it travels concurrently therewith.

7. The method defined in claim 5, wherein step (d) comprises moving the sheets along a substantially parallel path, the path extending between the holding area and the quench.

8. The method defined in claim 5 further comprising positioning the shaping members on different sides of the heated holding area as the sheet is positioned therein.

9. The method defined in claim 5 further comprising the step of returning the shaping members to positions adjacent different sides of the holding area after said sheet has been transferred to the quench.

10. The method defined in claim 7 further including sensing the presence of the sheet as it moves past a predetermined portion of the path, and actuating movement of at least one of the shaping members toward the other in response thereto.

11. In an apparatus for press shaping glass sheets and the like which apparatus includes a means adapted to heat the sheets to the desired deformation temperature, a quench downstream from the heating means, sheet grasping means and a pair of complementary shaping members which are spaced on opposite sides of the grasping means and adapted to impart the desired shape to the sheet interposed therebetween, the combination which comprises:
   (a) a heated holding station located between the heating means and the quench;
   (b) a shaping member assembly for transporting said shaping members;
   (c) a sheet carriage assembly in communication with said sheet grasping means for transporting the sheet from the heating means to the quench, said sheet carriage assembly adapted to engage said shaping member assembly for alignment of said sheet with said shaping members;
   (d) drive means for transporting both the sheet and the shaping members concurrently from the holding area toward the quench; and
   (e) means for moving at least one of the shaping members toward the other to press the sheet into the desired shape while the shaping members and the sheet travel substantially in unison toward the quench.

12. The apparatus defined in claim 11, wherein the drive means (d) comprises track means extending between the holding area and the quench, said track means including means located on different sides of the glass grasping means, each shaping member being transported substantially simultaneously along said track means.

13. The apparatus defined in claim 12, wherein each of the track means includes an angled track portion, each angled portion extending adjacent the holding station.

14. The apparatus defined in claim 13, wherein the shaping members are positioned on the angled track portions when a glass sheet is disposed within the holding area.

15. The apparatus defined in claim 14 further including sensor means located in the holding area for stopping the glass sheet in the holding area upon detection of the glass sheet whereby said glass sheet is properly aligned with the shaping members.

16. The apparatus defined in claim 15 further including second sensor means located intermediate the holding area and the quench to actuate the means (e).

17. The apparatus defined in claim 16 further including third sensor means located near the upstream portion of the quench to actuate retraction of the means (e), followed by release of the shaping members from the drive means, allowing the drive means to continue uninterrupted to transport the glass sheet into the quench.

18. The apparatus defined in claim 11, wherein the quench comprises a plurality of air jets.

19. The apparatus defined in claim 11, wherein said shaping member assembly comprises a pair of support members, a pair of arms each of which are pivotally mounted to a support member, with a shaping member attached to the end of each arm, and rollers rotatably mounted to said support members for transporting said shaping member assembly along said drive means (d).

20. The apparatus defined in claim 11, wherein said sheet grasping means is a tong supported by a rod which depends from said sheet carriage assembly.

* * * * *

UNITED STATES PATENT AND TRADEMARK OFFICE
CERTIFICATE OF CORRECTION

PATENT NO. : 4,123,245
DATED : October 31, 1978
INVENTOR(S) : William G. Bates

It is certified that error appears in the above-identified patent and that said Letters Patent are hereby corrected as shown below:

Column 2, line 27, delete "the" and insert therefor --and--.

Column 3, line 24, delete "thereof" and insert therefor --thereto--.

Column 5, line 27, delete "in" and insert therefor --is--.

Column 6, line 37, delete "are" and insert therefor --area--.

Signed and Sealed this

Third Day of April 1979

[SEAL]

Attest:

RUTH C. MASON
*Attesting Officer*

DONALD W. BANNER
*Commissioner of Patents and Trademarks*